W. ACHTMEYER.
DISK CLUTCH FACING AND PROCESS OF MAKING SAME.
APPLICATION FILED MAR. 10, 1921.
1,429,266.
Patented Sept. 19, 1922.
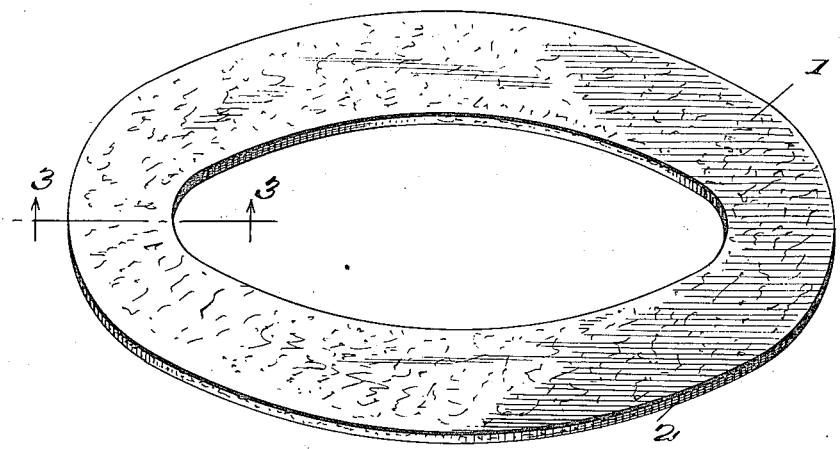
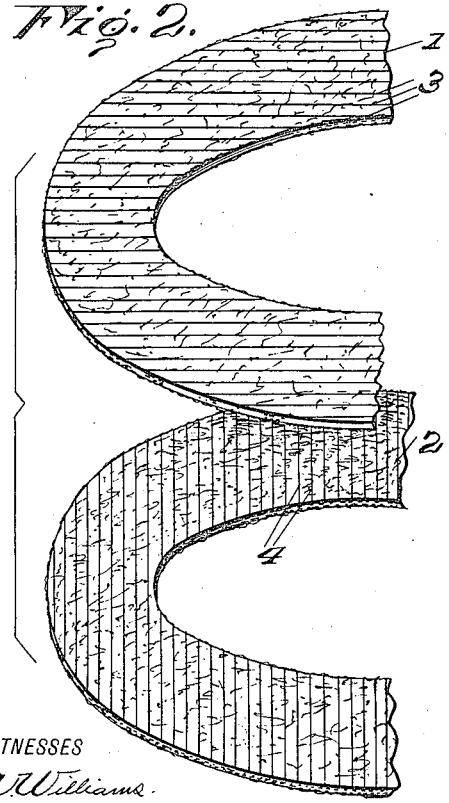
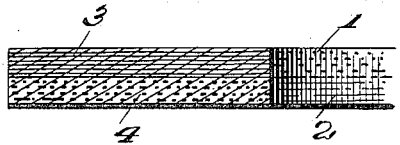
WITNESSES
INVENTOR
William Achtmeyer
BY
ATTORNEYS Patented Sept. 19, 1922.

1,429,266

UNITED STATES PATENT OFFICE.

WILLIAM ACHTMEYER, OF MIDDLETOWN, CONNECTICUT.

DISK CLUTCH FACING AND PROCESS OF MAKING SAME.

Application filed March 10, 1921. Serial No. 451,344.

*To all whom it may concern:*

Be it known that I, WILLIAM ACHTMEYER, a citizen of the United States, and a resident of Middletown, in the county of Middlesex and State of Connecticut, have made certain new and useful Improvements in Disk Clutch Facings and Processes of Making Same, of which the following is a specification.

My invention relates to the manufacture of improved clutch facings and especially those of the disk type and the object thereof is to produce a product which is non-inflammable unaffected by water, oil and heat which is practically unbreakable under service, and which has a high temperature of carbonization and which has a smooth and gradually increasing action.

A number of different clutch facings have been suggested, made generally from asbestos webbing on account of its cheapness. These facings are shaped from straight asbestos webbing into a circle and are impregnated with some compound and baked. In order to spin asbestos fiber into yarn or to weave it into webbing, it is necessary to mix at least 25% of cotton fiber therewith on account of the brittleness of the latter, and such cotton may be easily burned or charred by the heat which is developed by friction. Ordinarily the facings are made from straight asbestos web shaped into ring form which weakens the outside edge and thickens the inner edge which therefore very easily puckers. Such rings cannot be made endless, the ends must be fastened together by staples or stitches which however, do not prevent the rings from losing their shape. The surfaces of these linings are not as smooth as desired and will not produce an absolutely smooth gradually increasing action without jerking.

The clutch facings heretofore made from asbestos sheets or molded from asbestos fiber, are also unsatisfactory as they are brittle and break easily and swell and soften under the action of heat and do not operate smoothly.

In asbestos sheets or boards made on a paper machine the fibers run parallel to each other and longitudinally of the sheet. I found that clutch facings made from such sheets break and crack very easily and always longitudinally parallel to the fibers. I make my clutch facings of two thin rings impregnated with a condensation product such as that described in my application Serial No. 451,342, or my application Serial No. 451,345, filed Mar. 10, 1921, preferably Serial No. 451,342, the rings being cut from asbestos sheets such as described above and the fibers of one lying at an angle, preferably a right angle, to those of the other.

Referring to the drawings:

Figure 1 is a perspective view of one of my rings.

Figure 2 shows a broken separated view of the two parts of my ring, and

Figure 3 a cross section on the line 3—3 of Figure 1.

The rings 1 and 2 may be stamped from the same sheet, one ring being turned through 90° with respect to the other. These two rings may be separately impregnated with my compound and then cemented together and heat hardened. My condensation product may be used as the cement. The fibers 3 of the ring 1, run at a right angle to the fibers 4 of the ring 2. I make my impregnated composition as described in my application Serial No. 451,342, and it consists of a condensation product of phenol and formaldehyde, the reaction taking place with sodium tungstate. By the process therein described I obtain a thin fluid anhydrous condensation product which can be hardened by heat at atmospheric pressure. My rings 1 and 2 consisting entirely of asbestos which have been impregnated, are superposed one on the other and then placed in a heated oven. The heat is slowly increased from 100° C. to about 125° to 150° C. whereupon my impregnated compound becomes hard, infusible and insoluble, but requires further heat treatment to develop qualities which are useful in a clutch facing. The temperature is further increased to about 225° to 250° C. whereupon smoke is evolved and at about 275° to 300° C. all the volatile substances have been driven off, whereupon the articles are removed from the oven. They are cooled and if necessary ground to exact size. My rings will not glaze over and slip. They are very tough with great resistance, have a very high temperature of carbonization and are unaffected by water, oil and the heat that may be developed in actual use, and their action is a gradually increasing one. While I have shown my invention as applied to disk clutches, it is of course to be understood, it may be applied to cone clutches or any other type.

My rings can be machined and may be accidentally dropped on stone floors with only a very small percentage of breakage.

I claim:

1. A clutch facing comprising two asbestos rings, the fibers of one ring lying at an angle to the fibers of the other.

2. A clutch facing consisting of two sheets consisting entirely of asbestos, the fibers of one sheet lying in a direction at an angle to the other sheet.

3. A clutch facing comprising two asbestos rings, the fibers of one ring lying at an angle to the fibers of the other, the whole compounded into a unitary mass by a phenol condensation product.

4. A clutch facing consisting of two sheets consisting entirely of asbestos, the fibers of one sheet lying in a direction at an angle to the other sheet, the whole compounded into a unitary mass by a phenol condensation product.

5. The process of making a clutch facing which consists in cutting rings from an asbestos sheet having its fiber substantially parallel and treating said rings with a phenolic condensation product and superposing one ring on another, the fibers of the one ring running at an angle to the fibers of the other ring and in heating the rings together gradually to 300° C. at atmospheric pressure.

6. A clutch facing comprising asbestos and a condensation product of phenol and formaldehyde containing some sodium tungstate.

7. A clutch facing consisting of asbestos and a condensation product obtained by causing a reaction between phenol and formaldehyde in the presence of sodium tungstate.

WILLIAM ACHTMEYER.